(12) United States Patent
Su et al.

(10) Patent No.: US 12,577,109 B2
(45) Date of Patent: Mar. 17, 2026

(54) BORON-SULFUR-CODOPED POROUS CARBON MATERIAL AND PREPARATION METHOD AND USE THEREOF

(71) Applicant: Northwest Minzu University, Lanzhou City (CN)

(72) Inventors: Qiong Su, Lanzhou City (CN); Yanbin Wang, Lanzhou City (CN); Zhaoxia Li, Lanzhou City (CN); Dian Wang, Lanzhou City (CN); Shaofeng Pang, Lanzhou City (CN); Shuhe Kang, Lanzhou City (CN); Xiangfei Zhao, Lanzhou City (CN); Shuai Wei, Lanzhou City (CN); Xiaoting Xi, Lanzhou City (CN); Yu Tian, Lanzhou City (CN); Qing Wang, Lanzhou City (CN); Qi Chen, Lanzhou City (CN); Zhongxu Wang, Lanzhou City (CN); Lichun Liang, Lanzhou City (CN); Lihui Kang, Lanzhou City (CN); Shijun Cao, Lanzhou City (CN)

(73) Assignee: Northwest Minzu University, Lanzhou City (CN)

( * ) Notice: Subject to any disclaimer, the term of this patent is extended or adjusted under 35 U.S.C. 154(b) by 877 days.

(21) Appl. No.: 17/894,040

(22) Filed: Aug. 23, 2022

(65) Prior Publication Data

US 2023/0234851 A1 Jul. 27, 2023

(30) Foreign Application Priority Data

Jan. 24, 2022 (CN) ........................ 202210077116.X

(51) Int. Cl.
| | |
|---|---|
| *C01B 32/05* | (2017.01) |
| *H01G 11/24* | (2013.01) |
| *H01G 11/34* | (2013.01) |

(52) U.S. Cl.
CPC ............ *C01B 32/05* (2017.08); *H01G 11/24* (2013.01); *H01G 11/34* (2013.01); *C01P 2006/12* (2013.01); *C01P 2006/16* (2013.01); *C01P 2006/40* (2013.01); *C01P 2006/80* (2013.01)

(58) Field of Classification Search
CPC ........ C01B 32/05; H01G 11/24; H01G 11/34; C01P 2006/12; C01P 2006/16; C01P 2006/40; C01P 2006/80
See application file for complete search history.

(56) References Cited

U.S. PATENT DOCUMENTS

2016/0376154 A1* 12/2016 Lee ........................ C01B 32/198
549/213

* cited by examiner

*Primary Examiner* — Stuart L Hendrickson
(74) *Attorney, Agent, or Firm* — Notaro, Michalos & Zaccaria P.C.

(57) ABSTRACT

A boron-sulfur-codoped porous carbon material and a preparation method is disclosed. The boron-sulfur-codoped porous carbon material includes a porous carbon, and B and S doped in the surface and pores of the porous carbon; where B has a doping content of 5.56 wt. % to 7.85 wt. %, and S has a doping content of 0.90 wt. % to 1.55 wt. %. Test results of examples show that the boron-sulfur-codoped porous carbon material has high doping contents of B and S, and abundant pores; in a three-electrode system, the material shows a maximum specific capacitance of 168 F·g$^{-1}$ to 290.7 F·g$^{-1}$ at 0.5 A·g$^{-1}$; after the material is assembled into a symmetrical supercapacitor, the supercapacitor has an ultra-high energy density of 11.3 Wh·kg$^{-1}$ to 16.65 Wh·kg$^{-1}$ in a neutral electrolyte system, and has a capacitance retention rate of 97.09% to 100.67% after 10,000 life tests.

12 Claims, 17 Drawing Sheets

BORON-SULFUR-CODOPED POROUS CARBON MATERIAL AND PREPARATION METHOD AND USE THEREOF

CROSS REFERENCE TO RELATED APPLICATION

This patent application claims the benefit and priority of Chinese Patent Application No. 202210077116.X, filed on Jan. 24, 2022, the disclosure of which is incorporated by reference herein in its entirety as part of the present application.

TECHNICAL FIELD

The present disclosure belongs to the technical field of electrode materials, in particular to a boron-sulfur-codoped porous carbon material and a preparation method and use thereof.

BACKGROUND ART

Supercapacitors have fast charge and discharge, high energy density and excellent cycle performance. Porous carbon materials are common electrode materials for the supercapacitors. Biomass porous carbon material has a rich pore structure, which is conducive to the transport of electrons, thereby improving an electrochemical performance; and the biomass porous carbon material, converted from biomass as a precursor, has received extensive attention from supercapacitor researchers. The surface chemical properties of an electrode are one of the factors affecting the performance of carbon-based supercapacitors, and the transport of electrolyte ions depends on the degree of wettability of the electrode carbon materials. Doping atoms such as B and S can improve a wetting ability between the carbon material surface and a used electrolyte solution, enhancing the surface wettability and providing more electrochemically-active reaction points; the doping atoms can also provide additional pseudocapacitive contributions to the carbon material.

At present, most of doping processes of the carbon material are conducted on a single atom, and prepared materials have a low content of doping atoms, such that obtained doped porous carbon materials have poor electrochemical properties such as energy density and cycle life.

SUMMARY

In view of this, an objective of the present disclosure is to provide a boron-sulfur-codoped porous carbon material and a preparation method thereof. The boron-sulfur-codoped porous carbon material has a high content of doping atoms, which is beneficial to obtain a high energy density and a long cycle life, thereby meeting use requirements of supercapacitor electrodes.

In order to realize the objective of the present disclosure, the present disclosure provides the following technical solutions:

The present disclosure provides a boron-sulfur-codoped porous carbon material, including a porous carbon, and B and S doped in a surface and pores of the porous carbon; where the B has a doping content of 5.56 wt. % to 7.85 wt. %, and the S has a doping content of 0.90 wt. % to 1.55 wt. %.

Preferably, the boron-sulfur-codoped porous carbon material may have a pore size of 2 nm to 5 nm and a specific surface area of 360 m²/g to 400 m²/g.

The present disclosure further provides a preparation method of the boron-sulfur-codoped porous carbon material, including the following steps:

mixing a biological carbon source, boric acid, zinc chloride, thiourea, and water, and removing water to obtain a mixed raw material powder;

roasting the mixed raw material powder under a protective gas to obtain a roasted powder; and pickling the roasted powder to obtain the boron-sulfur-codoped porous carbon material.

Preferably, the biological carbon source may include one or more selected from the group consisting of *Hylotelephium erythrostictum* stalks, walnut green seedcases, wheat stalks, and corn stalks.

Preferably, the biological carbon source may have a mesh number of 50 mesh to 200 mesh.

Preferably, the biological carbon source and the boric acid may have a mass ratio of 1:(0.5-1.5);

the biological carbon source and the zinc chloride may have a mass ratio of (0.8-1):(1-1.2); and the biological carbon source and the thiourea may have a mass ratio of (0.8-1):(1-1.2).

Preferably, the roasting may be conducted at a roasting temperature of 400° C. to 1,000° C. for 1 h to 6 h.

Preferably, the roasting temperature may be obtained by heating from a room temperature at 2° C./min to 10° C./min.

The present disclosure further provides use of the boron-sulfur-codoped porous carbon material or a boron-sulfur-codoped porous carbon material prepared by the preparation method as an electrode material.

Preferably, the use may be in a supercapacitor.

The present disclosure provides a boron-sulfur-codoped porous carbon material, including a porous carbon, and B and S doped in the surface and pores of the porous carbon; where B has a doping content of 5.56 wt. % to 7.85 wt. %, and S has a doping content of 0.90 wt. % to 1.55 wt. %. In the present disclosure, the boron-sulfur-codoped porous carbon material has high doping contents of B and S, and higher contents of B and S doping atoms can improve a wetting ability between the carbon material surface and a used electrolyte solution, enhancing the surface wettability and providing more electrochemically-active reaction points; meanwhile, the higher contents of doping atoms B and S can also provide the carbon material with a higher additional pseudocapacitance, thereby improving electrochemical performances such as energy density and cycle life of the doped porous carbon material.

Test results of examples show that the boron-sulfur-codoped porous carbon material has high doping contents of B and S, and abundant pores; in a three-electrode system, the material shows a maximum specific capacitance of 168 $F \cdot g^{-1}$ to 290.7 $F \cdot g^{-1}$ at 0.5 $A \cdot g^{-1}$; after the material is assembled into a symmetrical supercapacitor, the supercapacitor has an ultra-high energy density of 11.3 $Wh \cdot kg^{-1}$ to 16.65 $Wh \cdot kg^{-1}$ in a neutral electrolyte system, and has a capacitance retention rate of 97.09% to 100.67% after 10,000 life tests.

The present disclosure further provides a preparation method of the boron-sulfur-codoped porous carbon material, including the following steps: mixing a biological carbon source, boric acid, zinc chloride, thiourea, and water, and removing water to obtain a mixed raw material powder; roasting the mixed raw material powder under a protective gas to obtain a roasted powder; and pickling the roasted powder to obtain the boron-sulfur-codoped porous carbon material. In the present disclosure, the zinc chloride is used as an activator, and then evaporated at high temperature; zinc chloride molecules enter the carbon as a skeleton, a carbon polymer is carbonized and deposited on the skeleton; after pickling, $ZnCl_2$ is removed, forming a well-developed pore structure. This hierarchical porous structure provides a conductive mesh with interconnections and short ion diffusion paths for rapid charge transport and ion migration. The boric acid and the thiourea provide porous carbon with abundant boron and sulfur atoms, and the boron atoms can be used as an electrocatalyst to accelerate redox reactions with functional groups containing O and N, thus providing additional pseudocapacitance. The B atoms in a carbon lattice can facilitate the chemisorption of $O_2$, resulting in the formation of reactive carbon surfaces. The thiourea introduces C—S, this n-type dopant S can provide more reversible pseudo-sites and polarized surfaces; moreover, sulfur-containing functional groups in the thiourea can act as a supporting framework for larger pores at high temperatures, reducing the shrinkage of micropores during carbonization, thereby providing rapid ion transport.

DETAILED DESCRIPTION OF THE EMBODIMENTS

Figure 1:
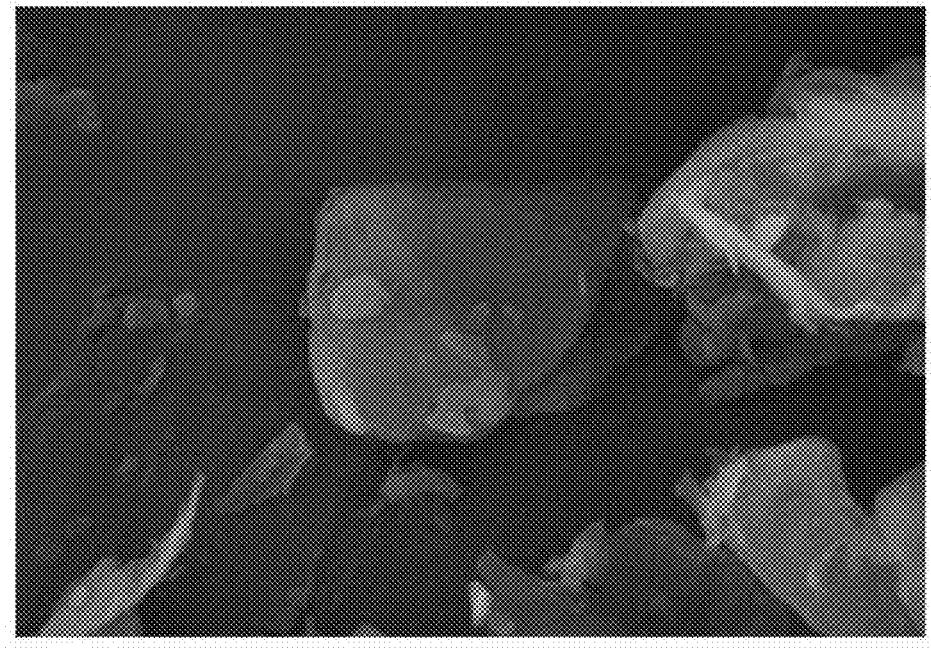
FIG. 1 shows a scanning electron microscope (SEM) image of a *Hylotelephium erythrostictum* stalk-derived carbon powder of Comparative Example 1.

The present disclosure provides a boron-sulfur-codoped porous carbon material, including a porous carbon, and B and S doped in the surface and pores of the porous carbon; where B has a doping content of 5.56 wt. % to 7.85 wt. %, and S has a doping content of 0.90 wt. % to 1.55 wt. %.

In the present disclosure, the boron-sulfur-codoped porous carbon material includes a porous carbon, and B and S doped in the surface and pores of the porous carbon. In the boron-sulfur-codoped porous carbon material, B has a doping content of 5.56 wt. % to 7.85 wt. %. In the boron-sulfur-codoped porous carbon material, S has a doping content of 0.90 wt. % to 1.55 wt. %.

In the disclosure, the boron-sulfur-codoped porous carbon material has a pore size of preferably 2 nm to 5 nm. The boron-sulfur-codoped porous carbon material has a specific surface area of preferably 360 $m^2/g$ to 400 $m^2/g$. The boron-sulfur-codoped porous carbon material has a pore volume of preferably 0.25 $cm^3/g$ to 0.3 $cm^3/g$.

The present disclosure further provides a preparation method of the boron-sulfur-codoped porous carbon material, including the following steps:

mixing a biological carbon source, boric acid, zinc chloride, thiourea, and water, and removing water to obtain a mixed raw material powder;

roasting the mixed raw material powder under a protective gas to obtain a roasted powder;

and pickling the roasted powder to obtain the boron-sulfur-codoped porous carbon material.

In the present disclosure, unless otherwise specified, each component in the preparation method is a commercially-available commodity well known to those skilled in the art.

In the present disclosure, the biological carbon source, the boric acid, the zinc chloride, the thiourea, and water are mixed, and water is removed to obtain the mixed raw material powder.

In the present disclosure, the biological carbon source includes preferably one or more selected from the group consisting of *Hylotelephium erythrostictum* stalks, walnut green seedcases, wheat stalks, and corn stalks. The biological carbon source has a mesh number of preferably 50 mesh to 200 mesh, more preferably 60 mesh to 190 mesh, and further more preferably 80 mesh to 150 mesh.

In the present disclosure, the biological carbon source is preferably subjected to water washing and drying in sequence, and a dried biological carbon source is mixed with the boric acid, the zinc chloride, the thiourea, and water. There is no special limitation on the water washing, as long as impurities attached to the biological carbon source can be removed. The drying is conducted at preferably 75° C. to 85° C., more preferably 78° C. to 83° C. for preferably 6 h to 16 h, more preferably 7 h to 15 h.

In the present disclosure, the biological carbon source and the boric acid ($H_3BO_3$) have a mass ratio of preferably 1:(0.5-1.5), more preferably 1:(0.6-1.4).

In the present disclosure, the biological carbon source and the zinc chloride ($ZnCl_2$) have a mass ratio preferably (0.8-1):(1-1.2), more preferably (0.9-1):(1-1.1), and most preferably 1:1.

In the present disclosure, the biological carbon source and the thiourea ($CH_4N_2S$) have a mass ratio preferably (0.8-1):(1-1.2), more preferably (0.9-1):(1-1.1), and most preferably 1:1.

In the present disclosure, the biological carbon source and water have a mass ratio of preferably 1:(15-25), more preferably 1:(18-23).

In the present disclosure, the biological carbon source, the boric acid, the zinc chloride, the thiourea and water are mixed by preferably stirring; there is no special limitation on a stirring rate, and stirring rates well known to those skilled in the art can be used; and there is no special limitation on a stirring time, as long as the materials can be fully mixed.

In the present disclosure, there is no special limitation on a mixing order of the biological carbon source, the boric acid, the zinc chloride, the thiourea, and water, as long as the materials can be mixed uniformly.

In the present disclosure, the water is removed by preferably drying. The drying is conducted at preferably 75° C. to 85° C., more preferably 78° C. to 83° C. The drying is conducted in preferably a blast drying oven.

In the present disclosure, by dissolving zinc chloride and mixing with the biological carbon source uniformly, the zinc chloride can be uniformly distributed on a carbon skeleton in the subsequent roasting and activation processes; this operation is beneficial to obtain a high-porosity porous carbon, and beneficial for the boric acid and the thiourea to introduce boron and sulfur atoms that can increase wettability and pseudocapacitance on carbon molecules, thereby obtaining a double-doped porous carbon. The method for mixing the materials makes the components dispersed evenly, overcomes uneven doping and activation of the activator (zinc chloride) and the dopants (boric acid and thiourea) during the activation, and is beneficial to improve a pore structure content and atomic doping content of the porous carbon.

In the present disclosure, the mixed raw material powder is roasted under the protective gas to obtain the roasted powder.

In the present disclosure, the protective gas includes preferably argon, nitrogen, or helium.

In the present disclosure, the roasting is conducted at preferably 400° C. to 1,000° C., more preferably 450° C. to 950° C. for preferably 1 h to 6 h, more preferably 2 h to 5 h.

In the present disclosure, the roasting temperature is obtained preferably by heating from a room temperature at preferably 2° C./min to 10° C./min, more preferably 3° C./min to 9° C./min. The roasting is conducted in preferably a tubular furnace.

In the present disclosure, an activation doping reaction occurs during the roasting; the zinc chloride vaporizes at high temperature and enters the carbon to play a skeleton role, and the biological carbon source acting as a carbon polymer is deposited on a surface of the skeleton after carbonization; and the boric acid and the thiourea provide boron and sulfur sources for doping into the porous carbon material.

In the present disclosure, the roasted powder is pickled to obtain the boron-sulfur-codoped porous carbon material.

In the present disclosure, the pickling is conducted by preferably hydrochloric acid. The hydrochloric acid has a concentration of preferably 1 mol/L to 4 mol/L, more preferably 1.5 mol/L to 3.5 mol/L. The pickling is conducted for preferably 6 h to 16 h, more preferably 7 h to 15 h. The hydrochloric acid can remove the zinc chloride uniformly distributed on the carbon skeleton, to generate a highly-developed pore structure that facilitates rapid charge transport and ion migration.

In the present disclosure, after the pickling, a pickled solid is preferably subjected to waster washing and drying. There is no special limitation on the water washing, as long as a pickling solution and impurities are washed off. In an example, a method for the water washing includes preferably: washing with water under suction filtration until a filtrate obtained by suction filtration has a neutral pH value. The drying is conducted at preferably 75° C. to 85° C., more preferably 77° C. to 83° C. for preferably 6 h to 16 h, more preferably 8 h to 14 h.

The present disclosure further provides use of the boron-sulfur-codoped porous carbon material or a boron-sulfur-codoped porous carbon material prepared by the preparation method as an electrode material.

In the present disclosure, the use is preferably in a supercapacitor.

There is no special limitation on the use of the boron-sulfur-codoped porous carbon material in the supercapacitor, and uses well known to those skilled in the art can be used.

To further illustrate the disclosure, the boron-sulfur-codoped porous carbon material and the preparation method and the use thereof provided in the present disclosure are described in detail below with reference to examples, but the examples should not be interpreted as a limitation to the protection scope of the present disclosure. Apparently, the described examples are merely some rather than all of the embodiments of the present disclosure. All other examples obtained by a person of ordinary skill in the art based on the examples of the present disclosure without creative efforts shall fall within the protection scope of the present disclosure.

Example 1

*Hylotelephium erythrostictum* stalks were washed with water, dried at 80° C., and pulverized to obtain a 100-mesh *Hylotelephium erythrostictum* stalk powder;

2 g of the *Hylotelephium erythrostictum* stalk powder, 2 g of boric acid, 2 g of zinc chloride, 2 g of thiourea and 40 mL of water were mixed by stirring, and dried at 80° C. for 12 h to remove water, to obtain a mixed raw material powder;

under nitrogen as a protective gas, the mixed raw material powder was placed in a porcelain boat, and roasted at 700° C. at a heating rate of 5° C./min in a tubular furnace for 2 h, to obtain a roasted powder; and the roasted powder was pickled for 12 h with 2 mol/L hydrochloric acid, followed by conducting water washing under suction filtration until a filtrate had a pH value of 7; and an obtained solid was dried at 80° C. for 12 h to obtain a boron-sulfur-codoped porous carbon material.

Example 2

A roasting temperature was changed to 600° C., while other technical means were the same as those in Example 1, to obtain a boron-sulfur-codoped porous carbon material.

Example 3

A roasting temperature was changed to 800° C., while other technical means were the same as those in Example 1, to obtain a boron-sulfur-codoped porous carbon material.

Example 4

A mass of boric acid was changed to 1 g, while the remaining technical means were the same as those in Example 2, to obtain a boron-sulfur-codoped porous material.

Example 5

A mass of boric acid was changed to 3 g, while the remaining technical means were the same as those in Example 2, to obtain a boron-sulfur-codoped porous material.

Example 6

The *Hylotelephium erythrostictum* stalks of Example 1 were replaced with walnut green seedcases, while the remaining technical means were the same as those in Example 1, to obtain a boron-sulfur-codoped porous material.

Example 7

The *Hylotelephium erythrostictum* stalks of Example 1 were replaced with wheat stalks, while the remaining technical means were the same as those in Example 1, to obtain a boron-sulfur-codoped porous material.

Example 8

The *Hylotelephium erythrostictum* stalks of Example 1 were replaced with corn stalks, while the remaining technical means were the same as those in Example 1, to obtain a boron-sulfur-codoped porous material.

Comparative Example 1

*Hylotelephium erythrostictum* stalks were washed with water, dried at 80° C., and pulverized to obtain a 100-mesh *Hylotelephium erythrostictum* stalk powder;

under nitrogen as a protective gas, 2 g of the *Hylotelephium erythrostictum* stalks were placed in a porcelain boat, and roasted at 700° C. at a heating rate of 5° C./min in a tubular furnace for 2 h, to obtain a *Hylotelephium erythrostictum* stalk-derived carbon powder.

Figure 2:
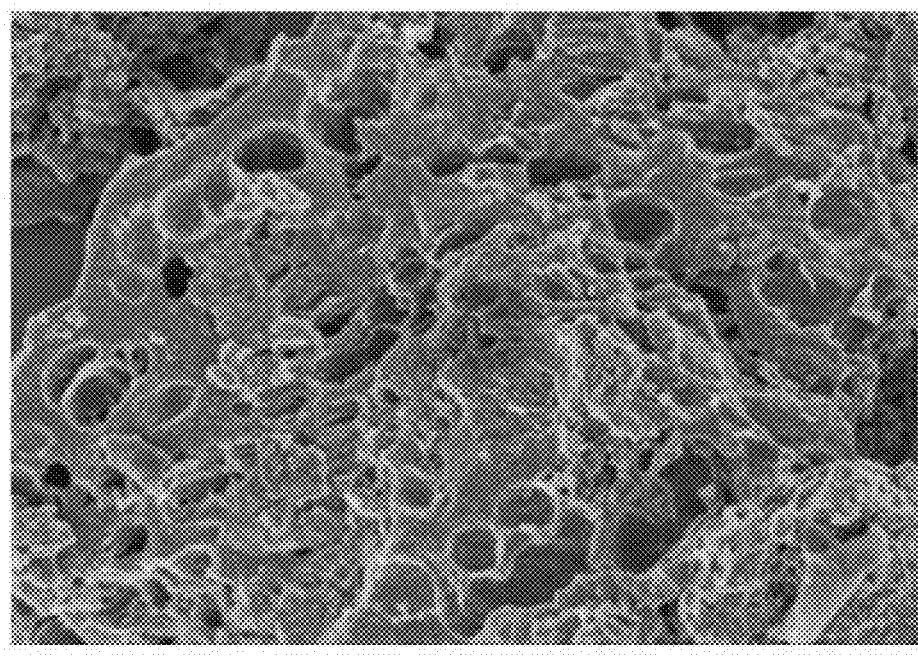
FIG. 2 shows a SEM image of a boron-sulfur-codoped porous carbon material obtained in Example 1.

Test:

(1) A SEM test was conducted on the *Hylotelephium erythrostictum* stalk-derived carbon powder of Comparative Example 1, and a SEM image obtained was shown in FIG. 1. It can be seen from FIG. 1 that a directly-carbonized sample of the *Hylotelephium erythrostictum* stalk-derived carbon powder presents a blocky structure with a smooth surface and no pore size. The SEM test was conducted on the boron-sulfur-codoped porous carbon material of Example 1, and a SEM image was shown in FIG. 2. It can be seen from FIG. 2 that the boron-sulfur-codoped porous carbon material of Example 1 forms a large number of randomly-distributed pores in the surface area, which facilitates faster adsorption and diffusion of ions from the electrolyte solution. This proves that after zinc chloride activation and subsequent roasting, the physical morphology of the carbon material has undergone benign changes.

Figure 3:
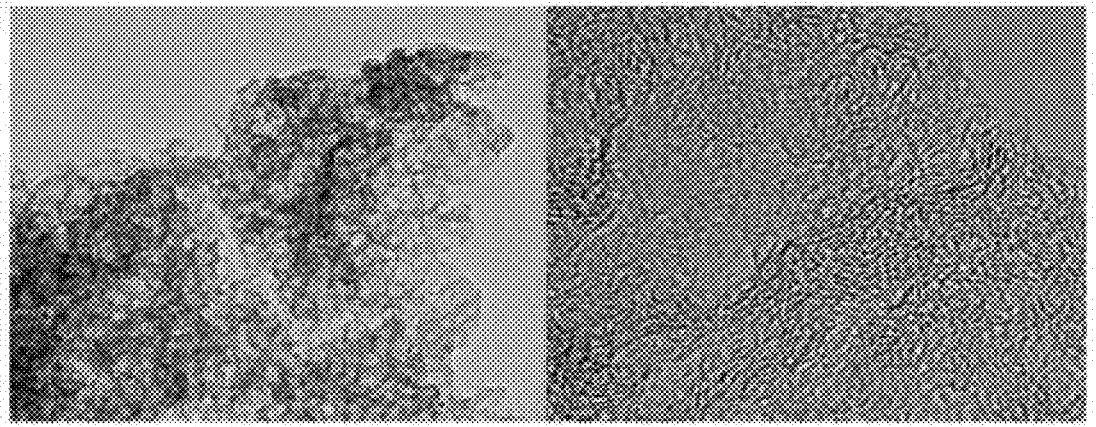
FIG. 3 shows a transmission electron microscope (TEM) image of the boron-sulfur-codoped porous carbon material obtained in Example 1.

(2) A TEM test was conducted on the boron-sulfur-codoped porous carbon material obtained in Example 1, and a TEM image was shown in FIG. 3, where left and right images of FIG. 3 were TEM images of different magnification sizes. It is further confirmed from FIG. 3 that the boron-sulfur-codoped porous carbon material obtained in Example 1 has a highly interconnected network structure.

In addition, it can be seen from the right image of FIG. 3 that there are a large number of white spots, indicating that the boron-sulfur-codoped porous carbon material has abundant micropores; moreover, lattice fringes (arranged graphite layers) can be observed therefrom, confirming that the boron-sulfur-codoped porous carbon material obtained in Example 1 has a layered graphite structure, and these fringes are graphite-related (002) planes. Therefore, the test results of FIG. 3 indicate that pore-rich carbon in the boron-sulfur-codoped porous carbon material is composed of abundant amorphous carbon and a small amount of graphitic structures.

Figure 4:
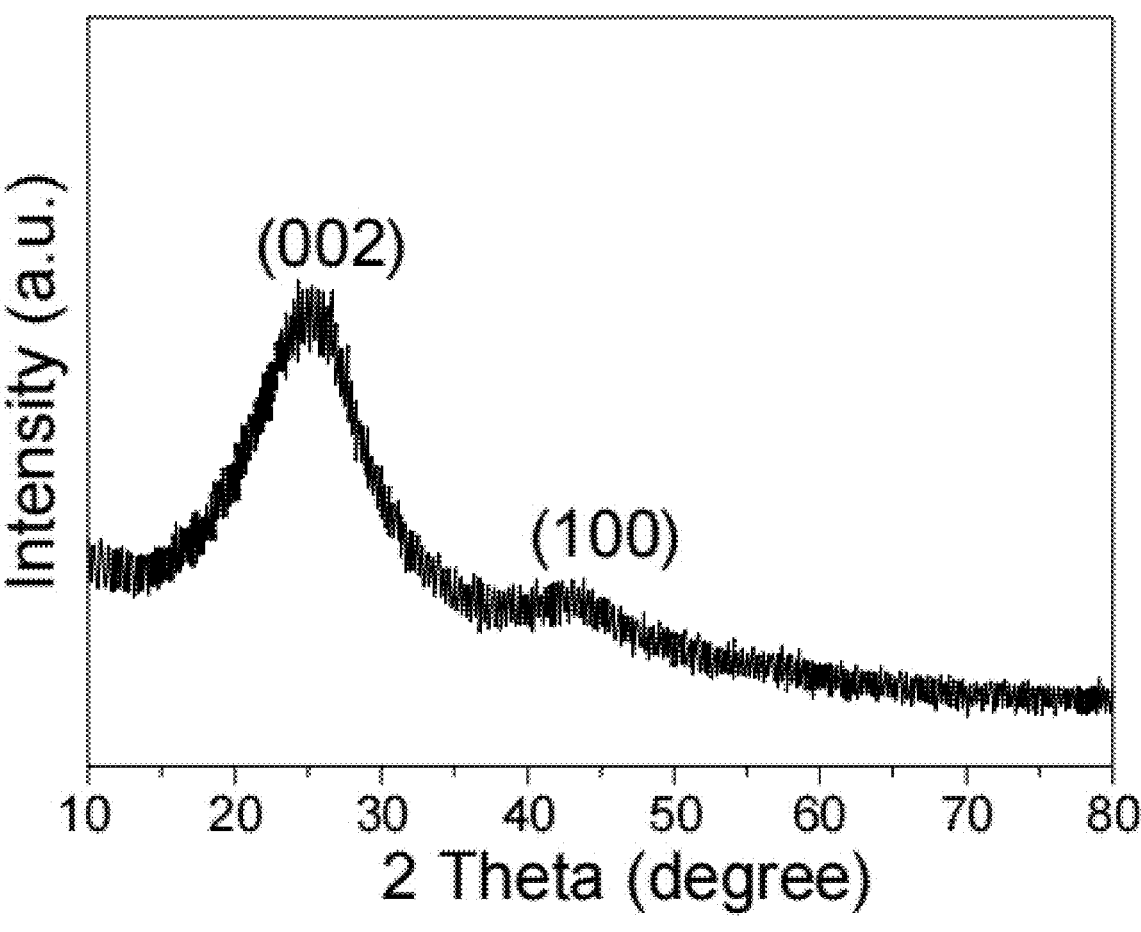
FIG. 4 shows an X-ray diffraction (XRD) pattern of the boron-sulfur-codoped porous carbon material obtained in Example 1.

(3) An X-ray diffraction test was conducted on the boron-sulfur-codoped porous carbon material obtained in Example 1, and an XRD pattern was shown in FIG. 4. It can be seen from FIG. 4 that 2 representative peaks are displayed at about 26° and 43.3°, which are related to the diffraction of (002) and (100), respectively, showing amorphous carbon characters of the sample, with a large number of irregular graphitic microcrystals; the (100) peak is relatively weak, indicating that the sample has uneven graphitization, which is due to a lower activation temperature used in this system, and the degree of graphitization is related to the activation temperature.

Figure 5:
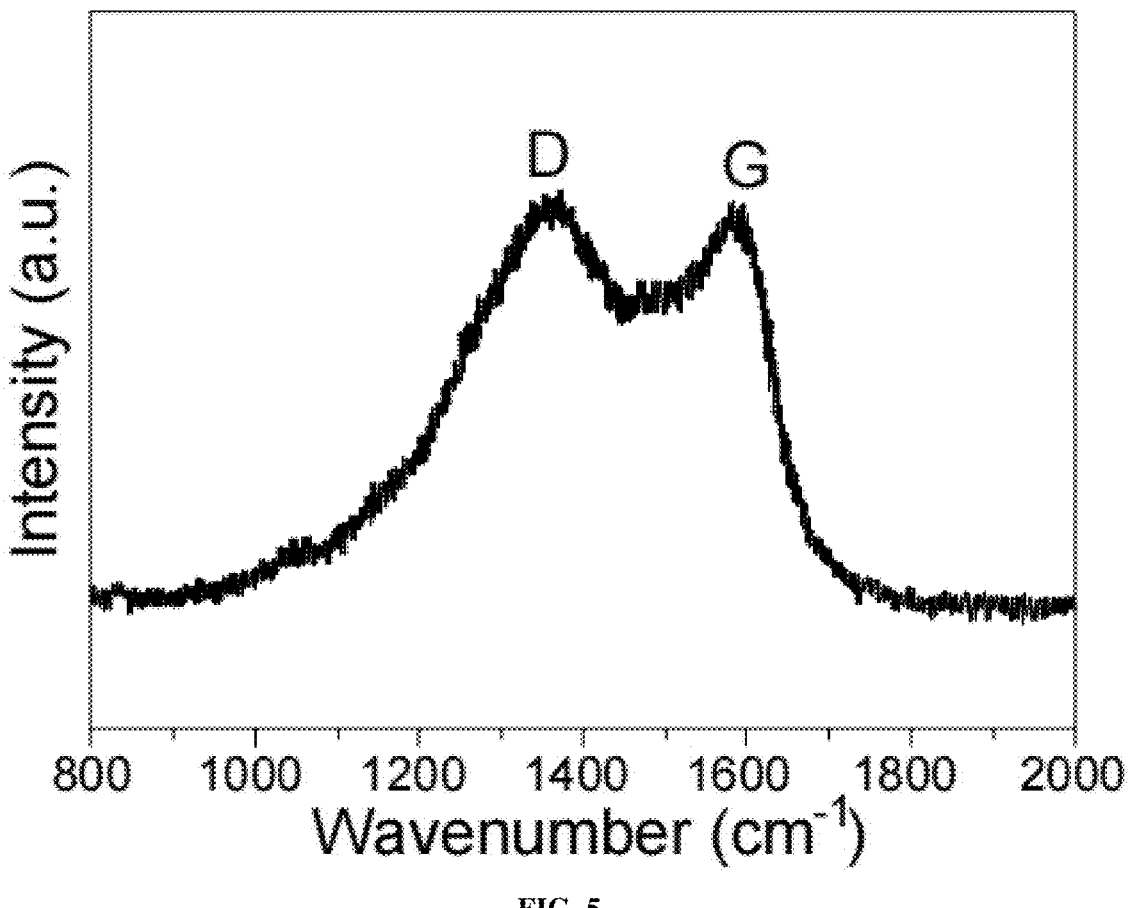
FIG. 5 is a Raman spectrum of the boron-sulfur-codoped porous carbon material obtained in Example 1.

(4) A Raman test was conducted on the boron-sulfur-codoped porous carbon material obtained in Example 1, and a Raman spectrum was shown in FIG. 5. It can be seen from FIG. 5 that a D peak (disorder or defect band) and a G peak (crystalline graphite band) of the boron-sulfur-codoped porous carbon material appear at Raman shifts of 1366 cm$^{-1}$ and 1593 cm$^{-1}$, respectively; the samples all show that a D peak content is higher a G peak content, indicating the presence of a large number of sp$^3$-bonded carbon atoms. An intensity ratio ($I_D/I_G$) is calculated to be 1.02, further indicating that the doping of B and S elements forms more defects in a skeleton of the carbon material that is believed to be beneficial to the ion diffusion.

Figure 6B:
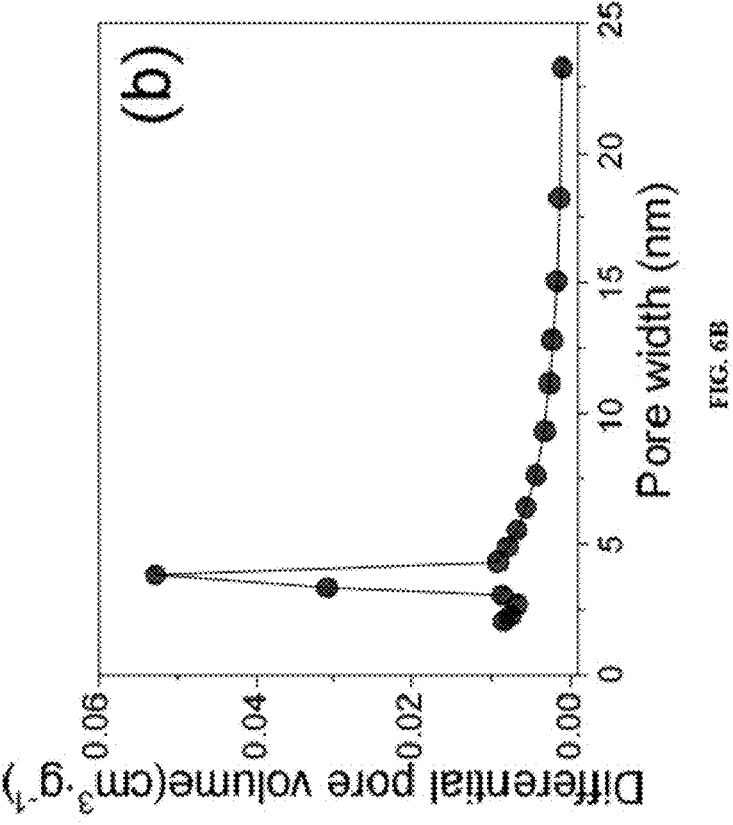
FIG. 6A-B shows a nitrogen adsorption-desorption spectrum of the boron-sulfur-codoped porous carbon material obtained in Example 1.
Figure 6A:
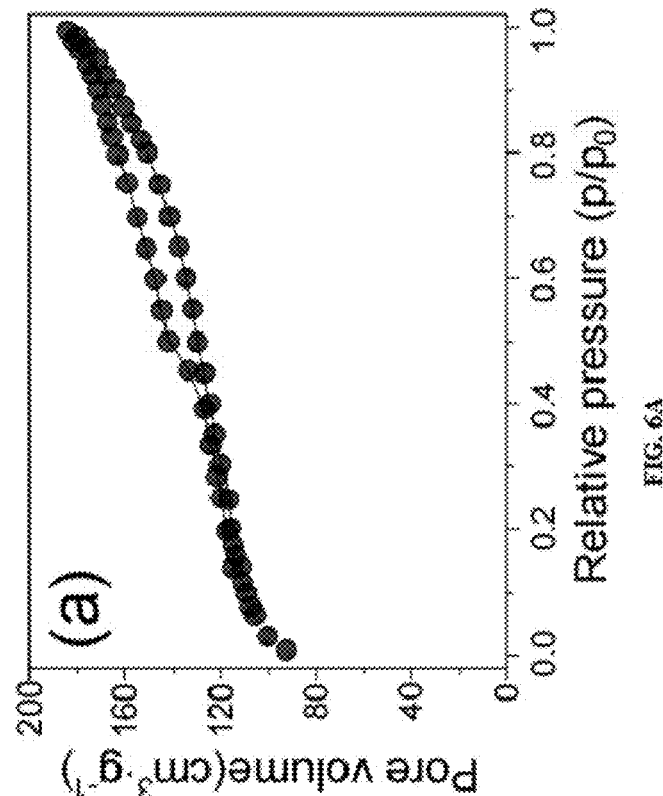
Figures 7A, 7B, 7C, 7D:
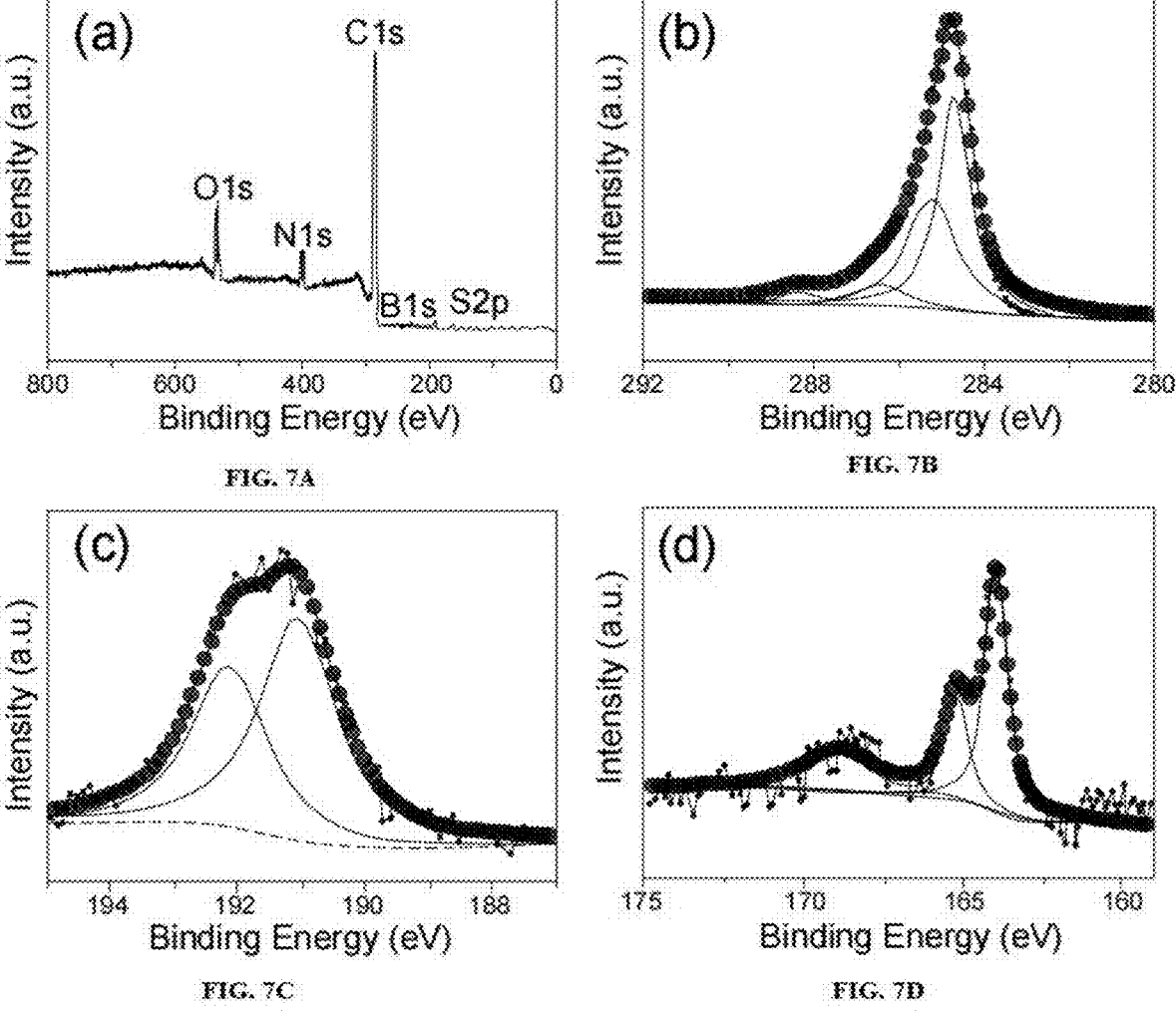
FIG. 7A-D shows an X-ray photoelectron spectroscopy (XPS) pattern of the boron-sulfur-codoped porous carbon material obtained in Example 1.
Figures 8A, 8B, 8C, 8D:
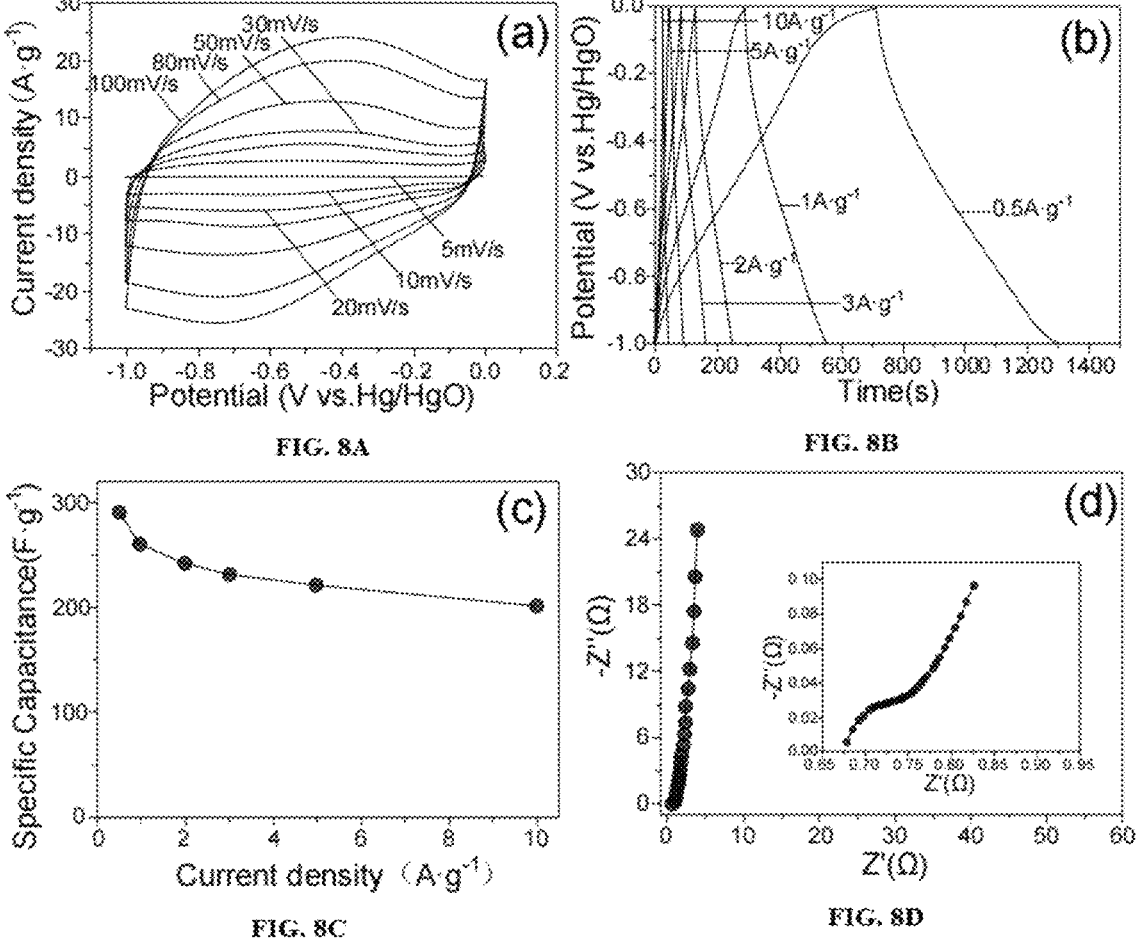
FIG. 8A-D shows an electrochemical test result of the boron-sulfur-codoped porous carbon material obtained in Example 1 under a three-electrode system.

(5) A nitrogen adsorption-desorption test was conducted on the boron-sulfur-codoped porous carbon material obtained in Example 1, and a nitrogen adsorption-desorption spectrum was shown in FIG. 6A-B. In FIG. 6A-B, (a) was an IV-type isotherm, and (b) was a pore size distribution curve. It can be seen from FIG. 6A-B that the steep adsorption of N$_2$ in a low pressure range (P/P$_0$<0.1) indicates the existence of micropores. In addition, at a larger relative pressure (P/P$_0$>0.4), the curve increases slowly, indicating that the sample also has mesoporous/macroporous characteristics. Notably, this facilitates buffering of the electrolyte in practical uses. Combined with FIG. 6 B, it is further confirmed that there are a large number of narrow mesopores (2 nm to 5 nm) with a small proportion in the boron-sulfur-codoped porous carbon material. According to BET results, the sample has a specific surface area of 400 m$^2$/g and a pore volume of 0.28 cm$^3$/g.

(6) An XPS test was conducted on the boron-sulfur-codoped porous carbon material obtained in Example 1, and an XPS spectrum was shown in FIG. 7A-D. In FIG. 7A-D, (a) was a total XPS spectrum, (b) was an XPS spectrum of C1s, (c) was an XPS spectrum of B1s, and (d) was an XPS spectrum of S2p. It can be seen from (a) of FIG. 7A-D that the peaks of B and S appear in the sample, meaning that due to the use of boric acid and thiourea, boron and sulfur elements have been successfully introduced into carbon; meanwhile, the XPS spectra also show N1s and O1s signals, clearly indicating that the carbonization of biomaterials may realize the inheritance of its own O$_2$ and N$_2$ in final carbon products. To highlight a boron-sulfur-codoped structure in the carbon matrix, high-resolution XPS images of C1s, B1s and S2p of the samples were further analyzed to determine their chemical states. It can be seen from (b) to (d) of FIG. 7 A-D that the C1s spectra each are fitted by four peaks, centered at 284.6 eV±0.1 eV, 285.2 eV±0.1 eV, 286.4 eV±0.1 eV, and 288.3 eV±0.1 eV, denoted as C—C, C—N—B, C—O/C—N, and C=O, respectively; in addition to carbon-carbon bonds, the binding to other elements is shown, where oxygen functional groups can increase surface hydrophilicity and bring additional pseudocapacitance. The B1s spectrum is fitted by 2 peaks, located at 190.8 eV±0.1 eV and 192 eV±0.1 eV, which can be assigned as B—C$_2$—O and B—C—O$_2$, respectively. Studies have shown that the relevant functional groups of B can act as electrochemical catalysts to promote the redox reactions of N and O, such that a certain content of N and O in the sample can also provide additional pseudocapacitance. In the boron-sulfur-codoped porous carbon material, the S2p spectrum is fitted by three peaks centered at 164 eV±0.1 eV, 165.2 eV±0.1 eV, and 168.9 eV±0.1 eV, which can be denoted as C—S, C—S—C and C—SO$_X$—C, respectively. These oxidized S functional groups are expected to improve the wettability of electrolytes.

(7) An electrochemical performance of the boron-sulfur-codoped porous carbon material obtained in Example 1 was tested under a three-electrode system: In order to explore potential utility of the boron-sulfur-codoped porous carbon electrode material in the field of supercapacitors, the capacitance characteristics in 6 mol/L KOH was measured by a three-electrode system, and test results were shown in FIG. 8A-D. In FIG. 8A-D, (a) was a CV curve at different scan rates, (b) was a GCD graph at various current densities, (c) was a relationship between specific capacitance and ampere density, (d) was an electrochemical impedance spectrum (EIS), and an inset of (d) was magnification of a Nyquist plot in a high-frequency region. It can be seen from (a) of FIG. 8A-D that the boron-sulfur-codoped porous carbon material as an electrode exhibits an obvious broad peak in the potential range from −1 V to 0 V, meaning that the presence of abundant surface heteroatoms contributes to formation of significant pseudocapacitance. These phenomena can be attributed to the following two possible reasons: (i) more active heteroatoms (especially B and S) not only provide larger pseudocapacitance, but also expose more ions on the hydrophilic surface and increase an area of the CV ring; (ii) the three-dimensional porous structure facilitates the conduction of electrons and improves charge transfer. It can be seen from (b) of FIG. 8A-D that at each current density, a constant-current charge-discharge curve corresponds to the CV curve, with slight deformation and a quasi-symmetric triangle, indicating that the reversibility is reliable and there are both EDLC and pseudocapacitance. It can be seen from FIG. 8 C that in the boron-sulfur-codoped porous carbon material, an electrode specific capacitance decreases with an increase of the ampere density, which is due to the enhanced diffusion confinement and the shorter ion transport time. The electrode of boron-sulfur-codoped porous carbon material exhibits a maximum specific capacitance of 290.7 F·g$^{-1}$ at 0.5 A·g$^{-1}$. Furthermore, the electrode of boron-sulfur-codoped porous carbon material exhibits a capacitor retention rate of 70% even at 10 A·g, showing an excellent rate capability. The reason is inferred that: the electrode rich in doping atoms can provide additional pseudocapacitance, and is beneficial to a contact probability between the electrode and the electrolyte, ensuring a large effective surface for charge storage, such that the electrode has an excellent rate performance. It can be seen from FIG. 8 D that the electrode of the boron-sulfur-codoped porous carbon material has a significantly promoted ion diffusion. In addition, the B/S porous carbon electrode exhibits an extremely low solution resistance of about 0.72 (2, and it can be inferred that the wettability brought by doping atoms greatly reduces the resistance and improves the conductivity of the sample.

Figure 9:
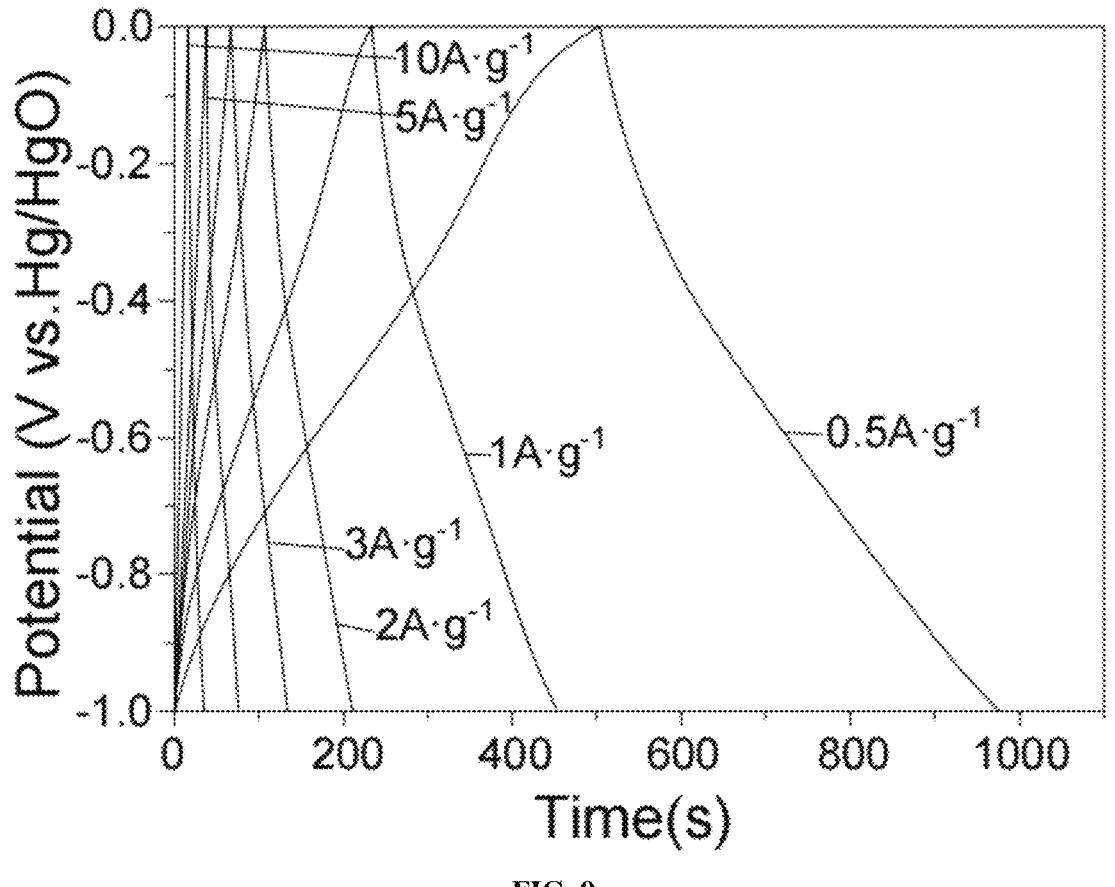
FIG. 9 shows an electrochemical test result of the boron-sulfur-codoped porous carbon material obtained in Example 2 under a three-electrode system.
Figure 10:
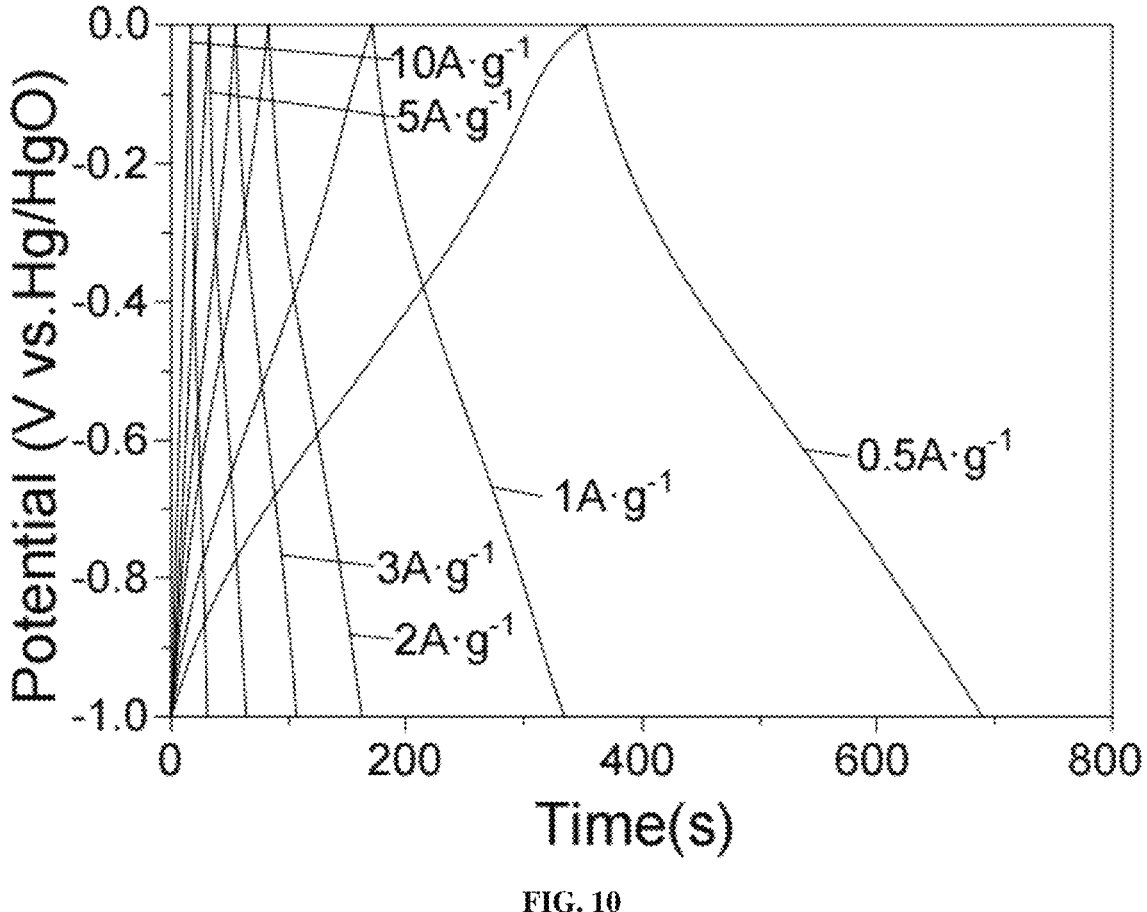
FIG. 10 shows an electrochemical test result of the boron-sulfur-codoped porous carbon material obtained in Example 3 under a three-electrode system.
Figure 11:
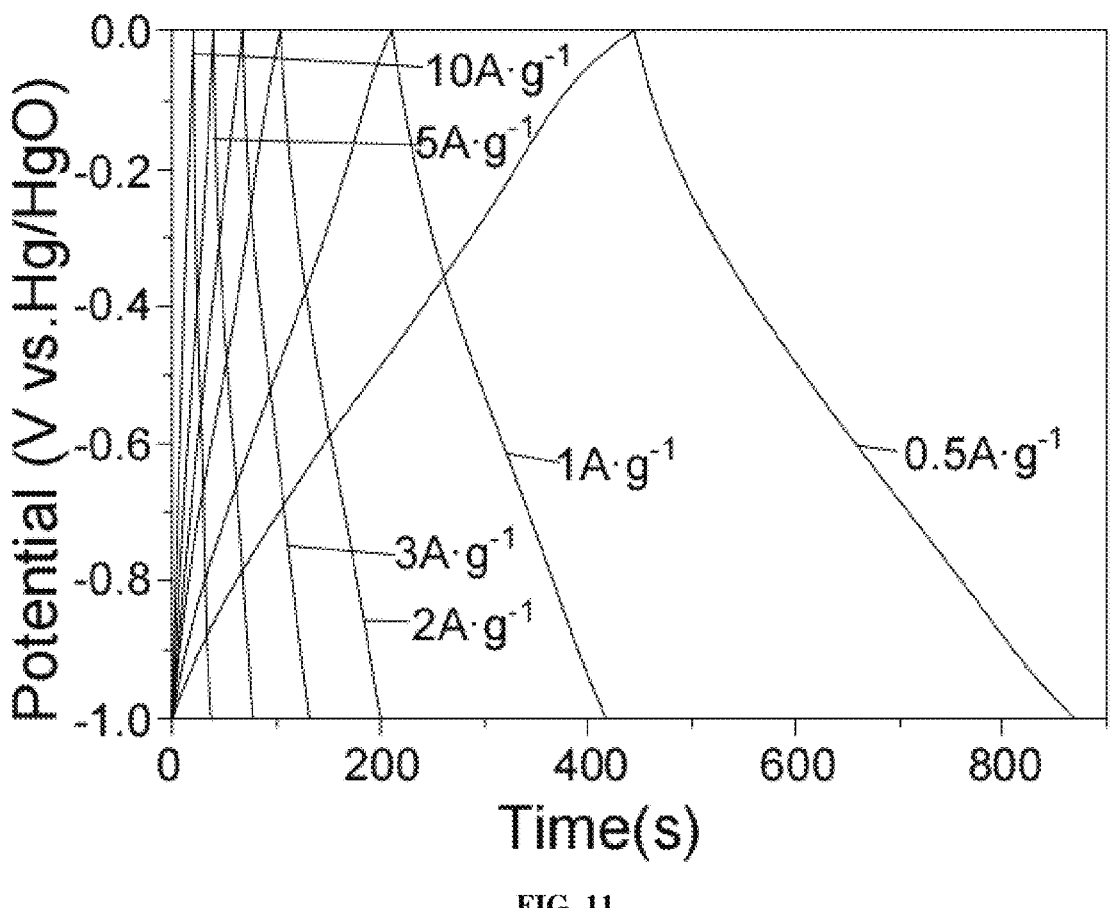
FIG. 11 shows an electrochemical test result of the boron-sulfur-codoped porous carbon material obtained in Example 4 under a three-electrode system.
Figures 12, 13:
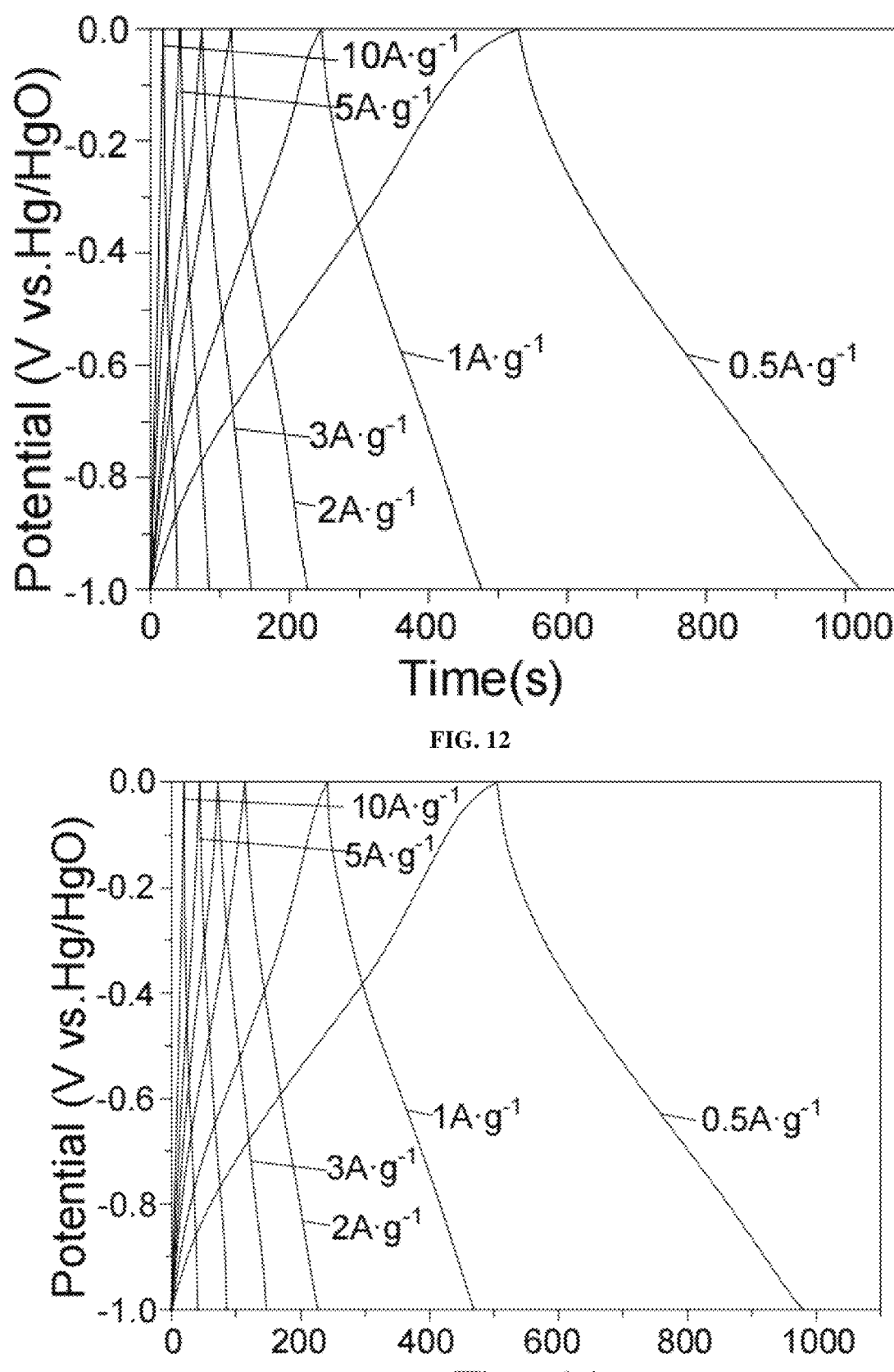
FIG. 12 shows an electrochemical test result of the boron-sulfur-codoped porous carbon material obtained in Example 5 under a three-electrode system.
FIG. 13 shows an electrochemical test result of the boron-sulfur-codoped porous carbon material obtained in Example 6 under a three-electrode system.
Figure 14:
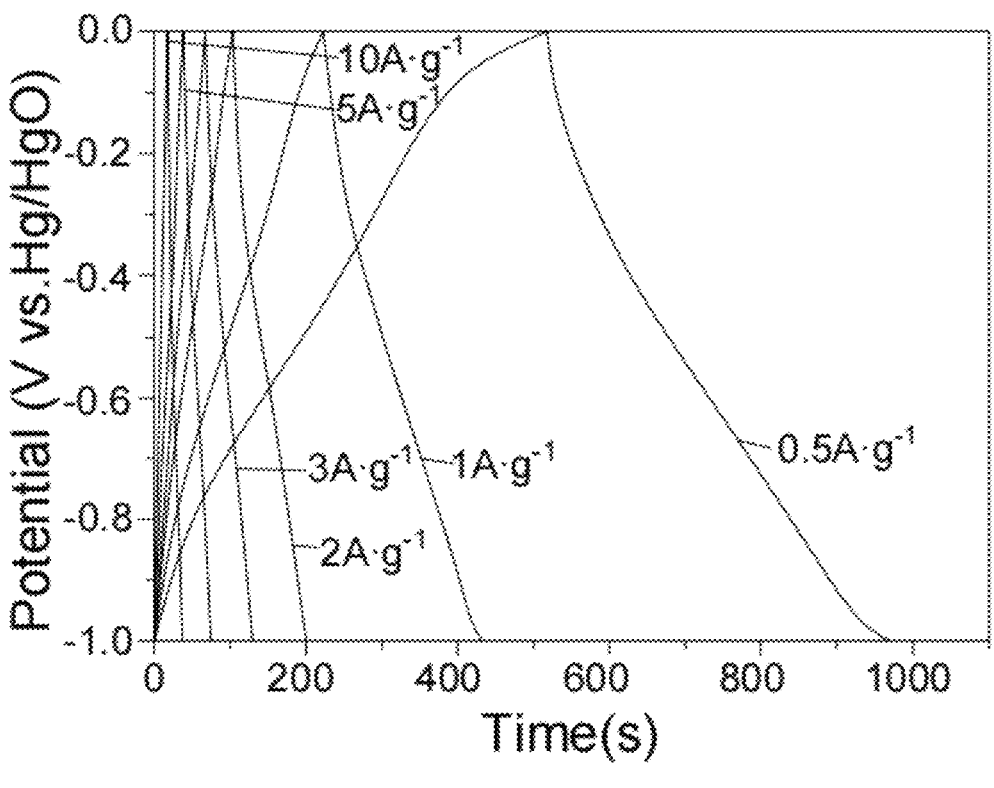
FIG. 14 shows an electrochemical test result of the boron-sulfur-codoped porous carbon material obtained in Example 7 under a three-electrode system.
Figure 15:
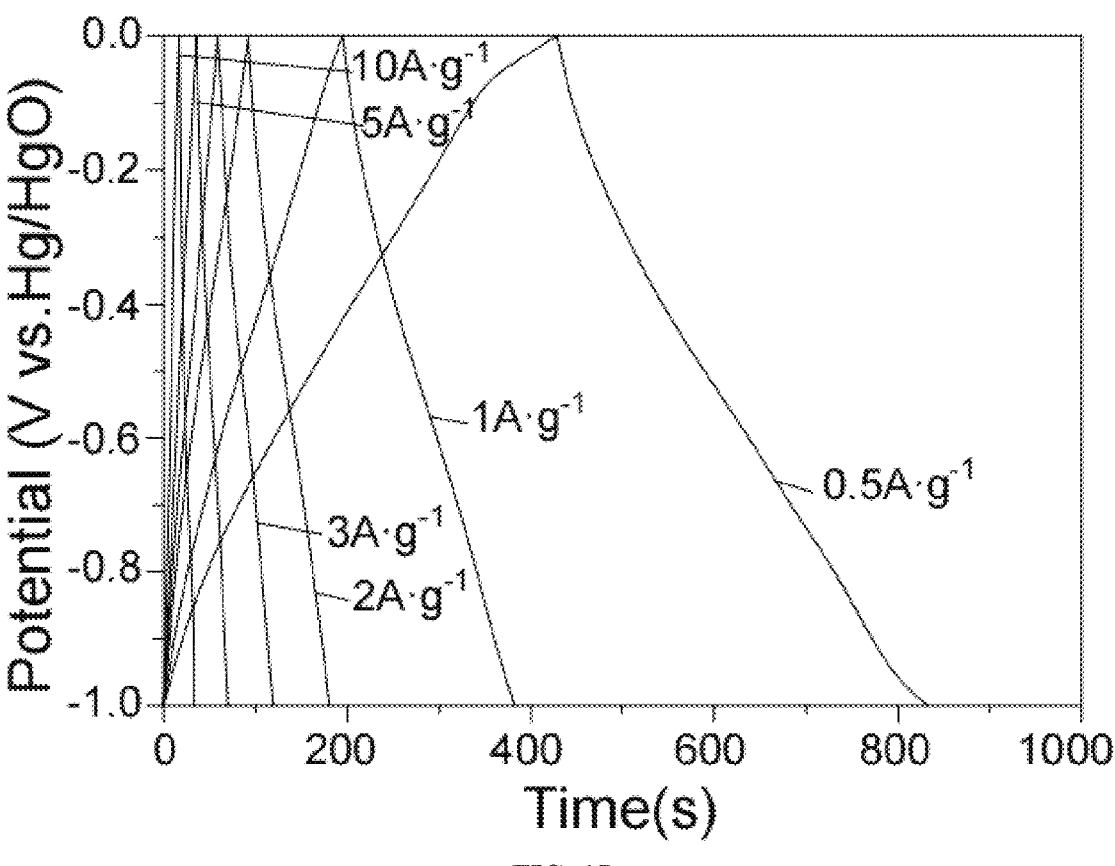
FIG. 15 shows an electrochemical test result of the boron-sulfur-codoped porous carbon material obtained in Example 8 under a three-electrode system.
Figures 16A, 16B, 16C, 16D:
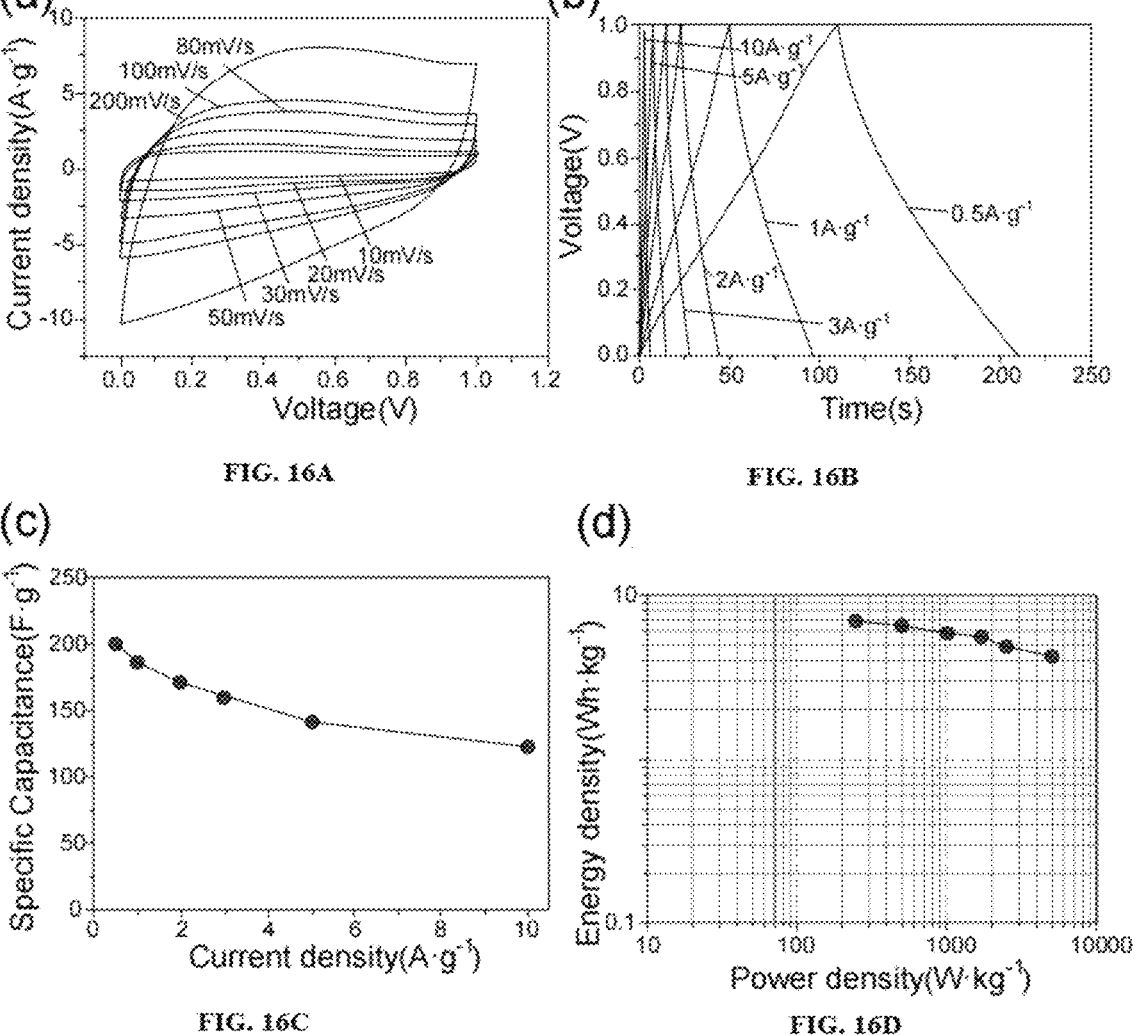
FIG. 16A-D shows an electrochemical test result of the boron-sulfur-codoped porous carbon material obtained in Example 1 in a symmetric supercapacitor system with KOH as an electrolyte.
Figures 17A, 17B, 17C, 17D:
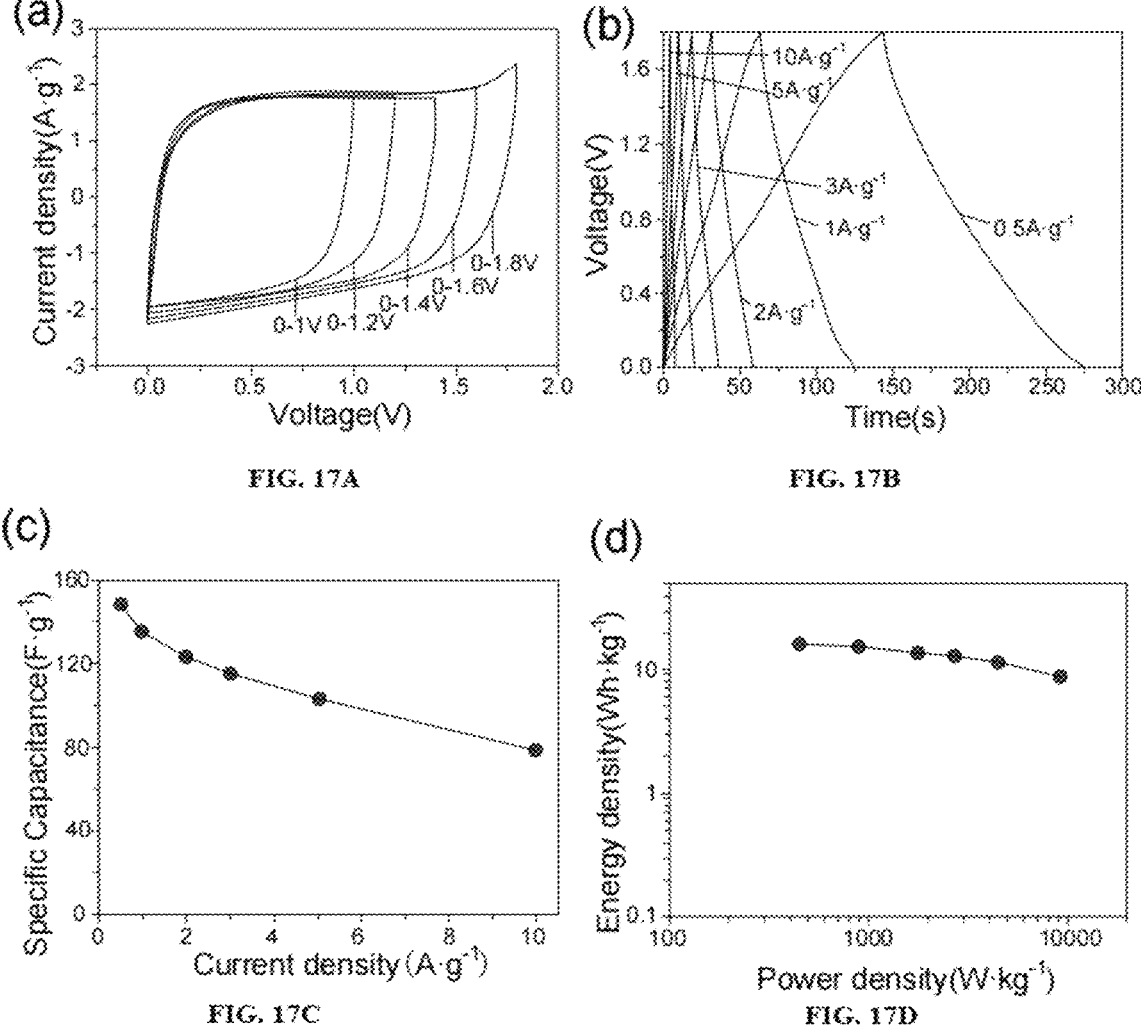
FIG. 17A-D shows an electrochemical test result of the boron-sulfur-codoped porous carbon material obtained in Example 1 in a symmetric supercapacitor system with $Na_2SO_4$ as an electrolyte.

(8) An electrochemical test was conducted on each of the boron-sulfur-codoped porous carbon materials obtained in Examples 2 to 8 under a three-electrode system. A test method was the same as that of Example 1, and test results were shown in FIG. 9 to FIG. 15. It can be seen from FIG. 9 that the electrode of the boron-sulfur-codoped porous carbon material shows a maximum specific capacitance of 237.9 F·g$^{-1}$ at 0.5 A·g$^{-1}$. It can be seen from FIG. 10 that the electrode of the boron-sulfur-codoped porous carbon material shows a maximum specific capacitance of 168 $F \cdot g^{-1}$ at 0.5 $A \cdot g^{-1}$. It can be seen from FIG. 11 that the electrode of the boron-sulfur-codoped porous carbon material shows a maximum specific capacitance of 212.3 $F \cdot g^{-1}$ at 0.5 $A \cdot g^{-1}$. It can be seen from FIG. 12 that the electrode of the boron-sulfur-codoped porous carbon material shows a maximum specific capacitance of 245.8 $F \cdot g^{-1}$ at 0.5 $A \cdot g^{-1}$. It can be seen from FIG. 13 that the electrode of the boron-sulfur-codoped porous carbon material shows a maximum specific capacitance of 240 $F \cdot g^{-1}$ at 0.5 $A \cdot g^{-1}$. It can be seen from FIG. 14 that the electrode of the boron-sulfur-codoped porous carbon material shows a maximum specific capacitance of 223 $F \cdot g^{-1}$ at 0.5 $A \cdot g^{-1}$. It can be seen from FIG. 15 that the electrode of the boron-sulfur-codoped porous carbon material shows a maximum specific capacitance of 200.2 $F \cdot g^{-1}$ at 0.5 $A \cdot g^{-1}$.

(9) After the boron-sulfur-codoped porous carbon material obtained in Example 1 was used as an electrode to assemble a symmetrical supercapacitor, an electrochemical test was conducted with 6 mol/L KOH as an electrolyte, and test results were shown in FIG. 16A-D. In FIG. 16A-D, (a) was a CV curve at different scan rates, (b) was a GCD diagram at various current densities, (c) was a relationship between specific capacitance and ampere density, and (d) was a Ragone diagram. It can be seen from FIG. 16A that the symmetric supercapacitor obtained with the boron-sulfur-codoped porous carbon material as the electrode has a CV curve showing a quasi-rectangular shape, and there is no obvious deformation even at a large scanning rate of 200 $mV \cdot s^{-1}$, indicating the dominance of an electric double layer with rapid charge/discharge process and desirable rate electrochemical performance. It can be seen from FIG. 16 B that the GCD curve presents a typical triangle, indicating ideal capacitance characteristics and electrochemical reversibility. It can be seen from FIG. 16 C that the symmetric supercapacitor prepared with the boron-sulfur-codoped porous carbon material as an electrode exhibits a high specific capacitance of 200 $F \cdot g^{-1}$ at 0.5 $A \cdot g^{-1}$, and still has a specific capacitance of 116.4 $F \cdot g^{-1}$ when the ampere density is increased to 10 $A \cdot g^{-1}$, showing an excellent rate performance. From FIG. 16 D, it is calculated that the supercapacitor has an energy density of 6.94 $Wh \cdot kg^{-1}$ and a power density of 248.4 $W \cdot kg^{-1}$.

Figures 18, 19:
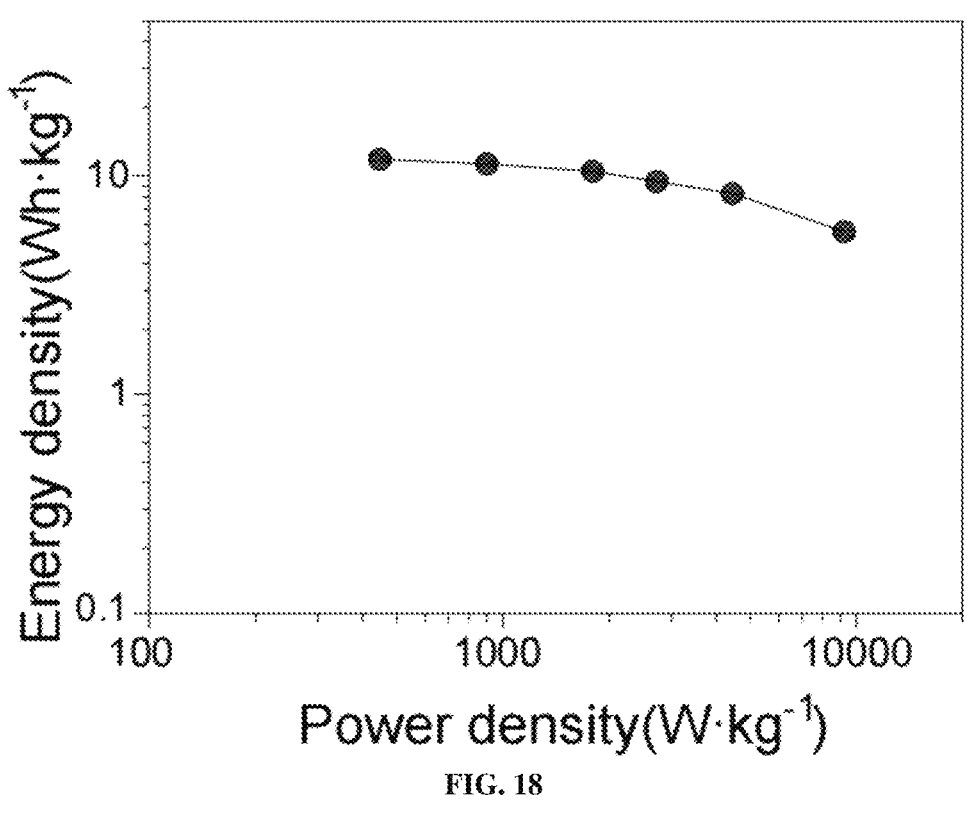
FIG. 18 shows an energy distribution plot of the boron-sulfur-codoped porous carbon material obtained in Example 6 in the symmetric supercapacitor system with $Na_2SO_4$ as an electrolyte.
FIG. 19 shows an energy distribution plot of the boron-sulfur-codoped porous carbon material obtained in Example 7 in the symmetric supercapacitor system with $Na_2SO_4$ as an electrolyte.
Figure 20:
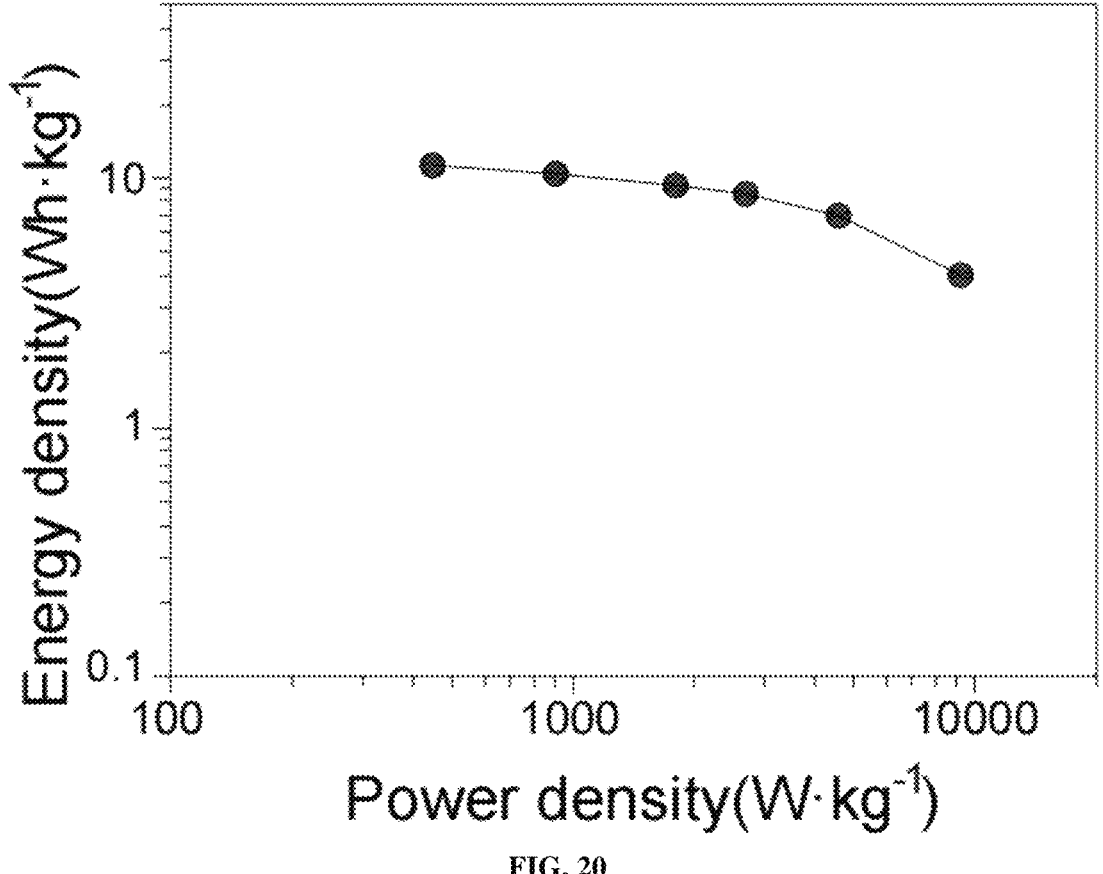
FIG. 20 shows an energy distribution plot of the boron-sulfur-codoped porous carbon material obtained in Example 8 in the symmetric supercapacitor system with $Na_2SO_4$ as an electrolyte.

(10) After the boron-sulfur-codoped porous carbon material obtained in Example 1 was used as an electrode to assemble a symmetrical supercapacitor, an electrochemical test was conducted with 1 mol/L $Na_2SO_4$ as an electrolyte, and test results were shown in FIG. 17A-D. In FIG. 17A-D, (a) was a CV curve at different scan rates, (b) was a GCD diagram at various current densities, (c) was a relationship between specific capacitance and ampere density, and (d) was a Ragone diagram. As can be seen from FIG. 17 A, when a voltage increase increases to 1.8 V, the CV curve remains roughly rectangular and symmetrical, with no obvious redox peaks, indicating an ideal capacitive behavior. As can be seen from FIG. 17 B, the GCD curve shows perfect symmetry and excellent reversibility. From FIG. 17 C, according to a discharge time, a specific capacitance is estimated to be 142 $F \cdot g^{-1}$ at an ampere density of 1 $A \cdot g^{-1}$. The capacitance decreases with an increasing current density. It can be seen from FIG. 17 C that at a power density of 450 $W \cdot kg^{-1}$, the symmetric supercapacitor has a maximum energy density of 16.65 $Wh \cdot kg^{-1}$. According to the test method of Example 1, the boron-sulfur-codoped porous carbon materials obtained in Examples 6 to 8 were assembled as electrodes to form symmetrical supercapacitors, and energy densities when 1 mol/L $Na_2SO_4$ was used as an electrolyte were shown in energy density diagrams FIG. 18 to FIG. 20. Among them, FIG. 18 showed an energy distribution plot of the boron-sulfur-codoped porous carbon material obtained in Example 6 in the symmetric supercapacitor system with $Na_2SO_4$ as an electrolyte; FIG. 19 showed an energy distribution plot of the boron-sulfur-codoped porous carbon material obtained in Example 7 in the symmetric supercapacitor system with $Na_2SO_4$ as an electrolyte; and FIG. 20 showed an energy distribution plot of the boron-sulfur-codoped porous carbon material obtained in Example 8 in the symmetric supercapacitor system with $Na_2SO_4$ as an electrolyte. It can be seen from FIG. 18 that the boron-sulfur-codoped porous carbon material obtained in Example 6 is used as an electrode to assemble a symmetrical supercapacitor with a maximum energy density of 12 $Wh \cdot kg^{-1}$. It can be seen from FIG. 19 that the boron-sulfur-codoped porous carbon material obtained in Example 7 is used as an electrode to assemble a symmetrical supercapacitor with a maximum energy density of 12.5 $Wh \cdot kg^{-1}$. It can be seen from FIG. 20 that the boron-sulfur-codoped porous carbon material obtained in Example 8 is used as an electrode to assemble a symmetrical supercapacitor with a maximum energy density of 11.3 $Wh \cdot kg^{-1}$.

Figures 21, 22:
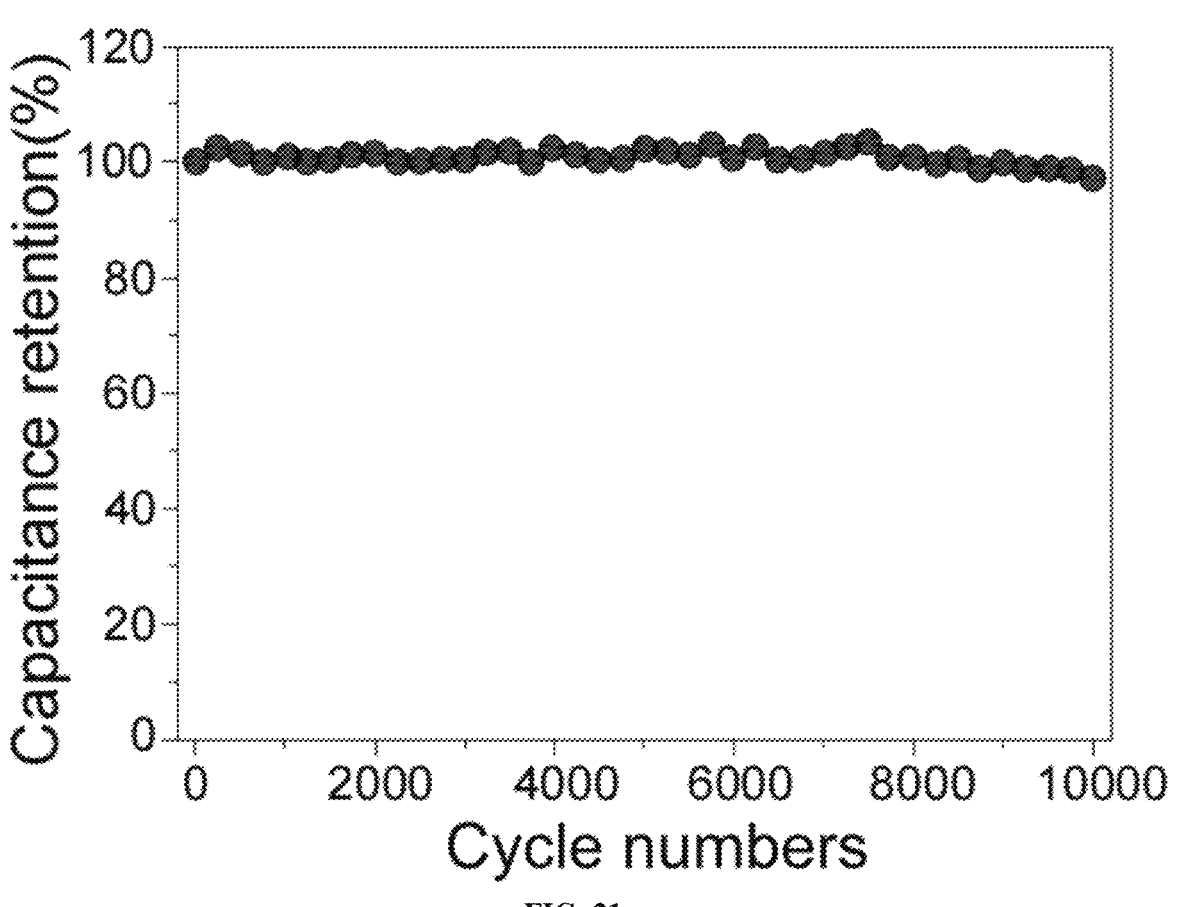
FIG. 21 shows a cycle life test of the boron-sulfur-codoped porous carbon material obtained in Example 1 in the symmetric supercapacitor system with $Na_2SO_4$ as an electrolyte.
FIG. 22 shows a cycle life test of the boron-sulfur-codoped porous carbon material obtained in Example 6 in the symmetric supercapacitor system with $Na_2SO_4$ as an electrolyte.
Figure 23:
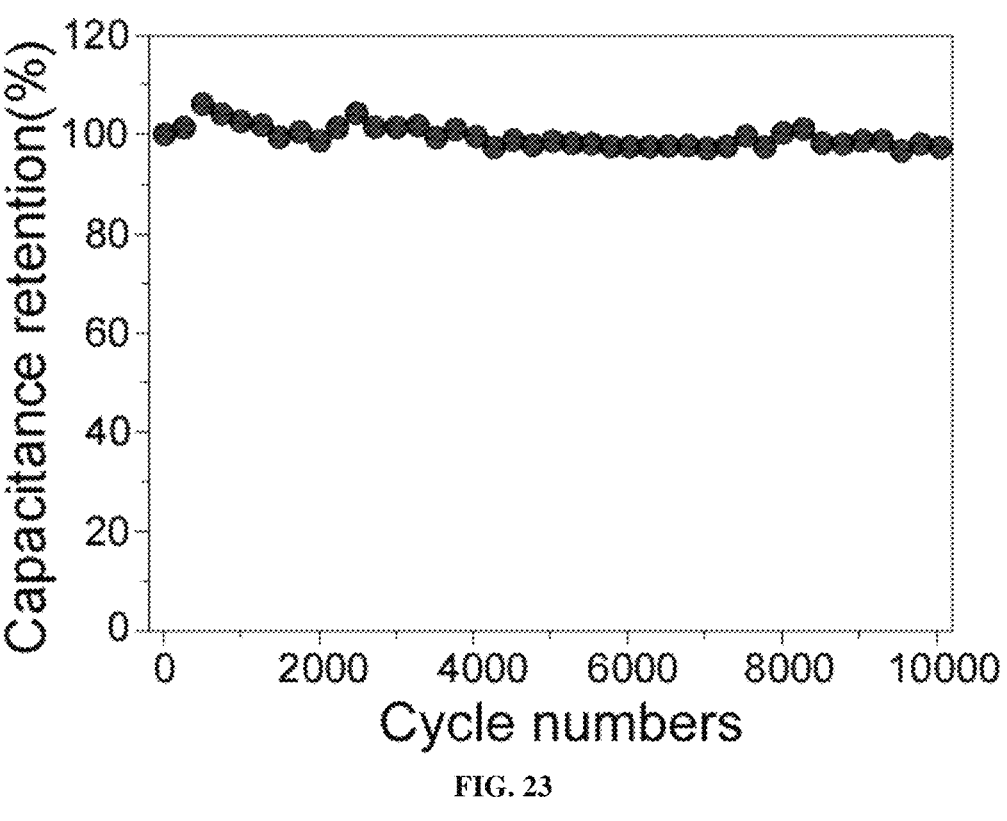
FIG. 23 shows a cycle life test of the boron-sulfur-codoped porous carbon material obtained in Example 7 in the symmetric supercapacitor system with $Na_2SO_4$ as an electrolyte.
Figure 24:
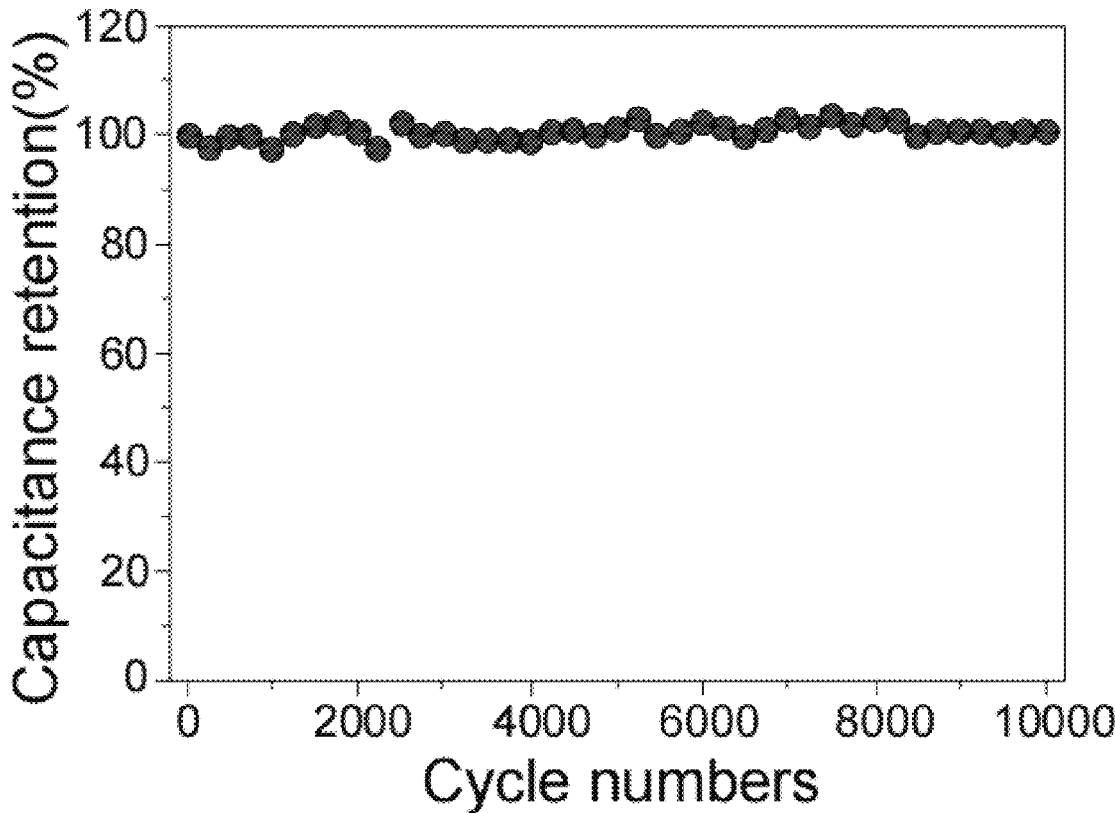
FIG. 24 shows a cycle life test of the boron-sulfur-codoped porous carbon material obtained in Example 8 in the symmetric supercapacitor system with $Na_2SO_4$ as an electrolyte.

(11) The boron-sulfur-codoped porous carbon material obtained in Example 1 was used as an electrode to assemble a symmetrical supercapacitor, 1 mol/L $Na_2SO_4$ was used as an electrolyte, and a cycle life test was conducted. The test results were shown in FIG. 21. It can be seen from FIG. 21 that at a current density of 10 $A \cdot g^{-1}$, the symmetric supercapacitor has a retention rate of about 97.09% after 10,000 cycles. According to the test method of Example 1, the boron-sulfur-codoped porous carbon materials obtained in Examples 6 to 8 were assembled as electrodes to form symmetrical supercapacitors, and cycle lives when 1 mol/L $Na_2SO_4$ was used as an electrolyte were shown in FIG. 22 to FIG. 24. Among them, FIG. 22 showed a cycle life test of the boron-sulfur-codoped porous carbon material obtained in Example 6 in the symmetric supercapacitor system with $Na_2SO_4$ as an electrolyte; FIG. 23 showed a cycle life test of the boron-sulfur-codoped porous carbon material obtained in Example 7 in the symmetric supercapacitor system with $Na_2SO_4$ as an electrolyte; and FIG. 24 showed a cycle life test of the boron-sulfur-codoped porous carbon material obtained in Example 8 in the symmetric supercapacitor system with $Na_2SO_4$ as an electrolyte. It can be seen from FIG. 22 that at a current density of 10 $A \cdot g^{-1}$, after 10,000 cycles, the symmetric supercapacitor obtained from the boron-sulfur-codoped porous carbon material in Example 6 has a retention rate of about 98.2%. It can be seen from FIG. 23 that at a current density of 10 $A \cdot g^{-1}$, after 10,000 cycles, the symmetric supercapacitor obtained from the boron-sulfur-codoped porous carbon material in Example 7 has a retention rate of about 97.6%. It can be seen from FIG. 24 that at a current density of 10 $A \cdot g^{-1}$, after 10,000 cycles, the symmetric supercapacitor obtained from the boron-sulfur-codoped porous carbon material in Example 8 has a retention rate of about 100.67%. Such results indicate that the as-prepared boron-sulfur-codoped porous carbon material exhibits an excellent long-term cycling performance with a long cycle life.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a boron-sulfur-codoped porous carbon material, comprising the following steps:

mixing a biological carbon source, boric acid, zinc chloride, thiourea, and water, and removing water to obtain a mixed raw material powder;

roasting the mixed raw material powder under a protective gas to obtain a roasted powder; and pickling the roasted powder to obtain the boron-sulfur-codoped porous carbon material;

wherein the boron-sulfur-codoped porous carbon material comprises a porous carbon, and B and S doped in the surface and pores of the porous carbon; and wherein the B has a doping content of 5.56 wt. % to 7.85 wt. %, and the S has a doping content of 0.90 wt. % to 1.55 wt. %.

2. The preparation method according to claim 1, wherein the biological carbon source comprises one or more selected from the group consisting of *Hylotelephium erythrostictum* stalks, walnut green seedcases, wheat stalks, and corn stalks.

3. The preparation method according to claim 1, wherein the biological carbon source and the boric acid have a mass ratio of 1:(0.5-1.5);

the biological carbon source and the zinc chloride have a mass ratio of (0.8-1):(1-1.2); and the biological carbon source and the thiourea have a mass ratio of (0.8-1):(1-1.2).

4. The preparation method according to claim 1, wherein the roasting is conducted at a roasting temperature of 400° C. to 1,000° C. for 1 h to 6 h.

5. The preparation method according to claim 4, wherein the roasting temperature is obtained by heating from a room temperature at 2° C./min to 10° C./min.

6. The preparation method according to claim 1, wherein the roasting temperature is obtained by heating from a room temperature at 2° C./min to 10° C./min.

7. The preparation method according to claim 1, wherein the boron-sulfur-codoped porous carbon material has a pore size of 2 nm to 5 nm and a specific surface area of 360 m²/g to 400 m²/g.

8. The preparation method according to claim 7, wherein the biological carbon source comprises one or more selected from the group consisting of *Hylotelephium erythrostictum* stalks, walnut green seedcases, wheat stalks, and corn stalks.

9. The preparation method according to claim 7, wherein the roasting is conducted at a roasting temperature of 400° C. to 1,000° C. for 1 h to 6 h.

10. The preparation method according to claim 9, wherein the roasting temperature is obtained by heating from a room temperature at 2° C./min to 10° C./min.

11. The preparation method according to claim 7, wherein the roasting temperature is obtained by heating from a room temperature at 2° C./min to 10° C./min.

12. The preparation method according to claim 7, wherein the biological carbon source and the boric acid have a mass ratio of 1:(0.5-1.5);

the biological carbon source and the zinc chloride have a mass ratio of (0.8-1):(1-1.2); and the biological carbon source and the thiourea have a mass ratio of (0.8-1):(1-1.2).

* * * * *